United States Patent [19]
Gristock

[11] Patent Number: 6,148,488
[45] Date of Patent: Nov. 21, 2000

[54] PIPE CLIP TYPE FLEXIBLE-SHEET FASTENING DEVICE

[76] Inventor: Rick Alan Gristock, P.O. Box 1253, Kurtistown, Hi. 96760

[21] Appl. No.: 09/393,449

[22] Filed: Sep. 10, 1999

Related U.S. Application Data

[60] Provisional application No. 60/100,106, Sep. 14, 1998.

[51] Int. Cl.[7] ................................................. A44B 21/00
[52] U.S. Cl. ............................ 24/462; 24/339; 24/460; 160/392
[58] Field of Search ........................... 24/462, 460, 297, 24/570, 563, 459, 339, 457; 160/392, 84.04, 84.01, 395; 248/68.1, 74.2; 52/222, 772

[56] References Cited

U.S. PATENT DOCUMENTS

| | | | |
|---|---|---|---|
| 4,144,622 | 3/1979 | Yoshinari | 24/462 |
| 4,170,810 | 10/1979 | Peleg | 24/462 |
| 4,231,141 | 11/1980 | Derrick et al. | 24/462 |
| 4,267,876 | 5/1981 | Bloomfield | 160/392 |
| 4,467,504 | 8/1984 | Quist . | |
| 4,534,145 | 8/1985 | Yang et al. . | |
| 4,550,605 | 11/1985 | Schaty . | |
| 4,550,891 | 11/1985 | Schaty . | |
| 4,614,321 | 9/1986 | Andre . | |
| 4,638,532 | 1/1987 | Yang et al. | 24/462 |
| 4,658,522 | 4/1987 | Kramer | 24/339 |
| 4,682,642 | 7/1987 | Hogshead, III et al. | 24/460 X |
| 5,065,562 | 11/1991 | Larsen et al. . | |
| 5,182,827 | 2/1993 | Carrier et al. | 24/462 X |
| 5,752,297 | 5/1998 | Ramey | 24/462 |
| 5,765,787 | 6/1998 | de Beers et al. . | |
| 5,862,850 | 1/1999 | Yang | 24/462 X |

FOREIGN PATENT DOCUMENTS

WO 97/07339   2/1997   WIPO .

*Primary Examiner*—Robert J. Sandy

[57] ABSTRACT

A clip for the purpose of fastening plastic, tarpaulins, fabric or other flexible-sheet goods to any kind of structure, appurtenance to a structure or vehicle or other construct or object, where the framing of such structure, appurtenance, or object consists of pipe, rod, or other tubular component which is most commonly round in cross-section and of metal or plastic, but other configurations and compositions are also possible. The clip allows a firm and solid connection of the flexible-sheet goods to the tubular components, in a manner which does not damage the flexible-sheet goods, and is removable and reusable.

5 Claims, 2 Drawing Sheets

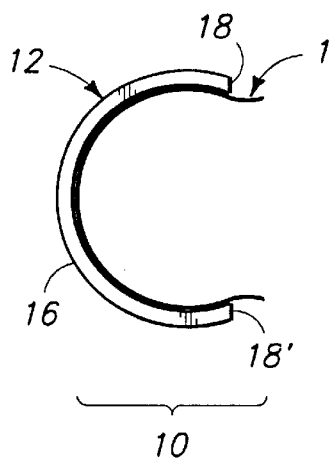
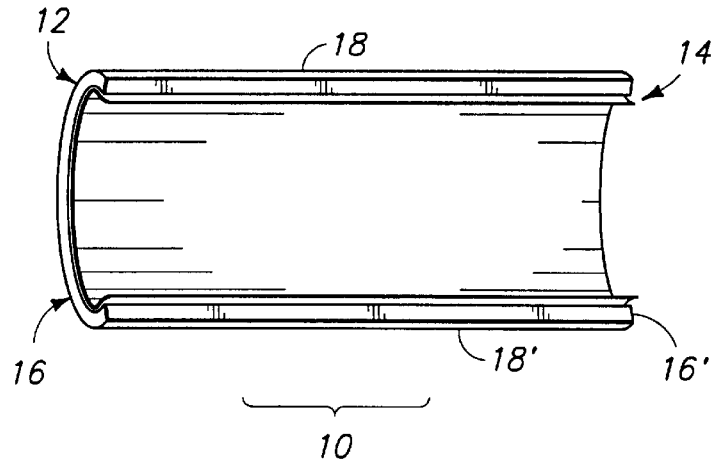
FIG. 1                    FIG. 2
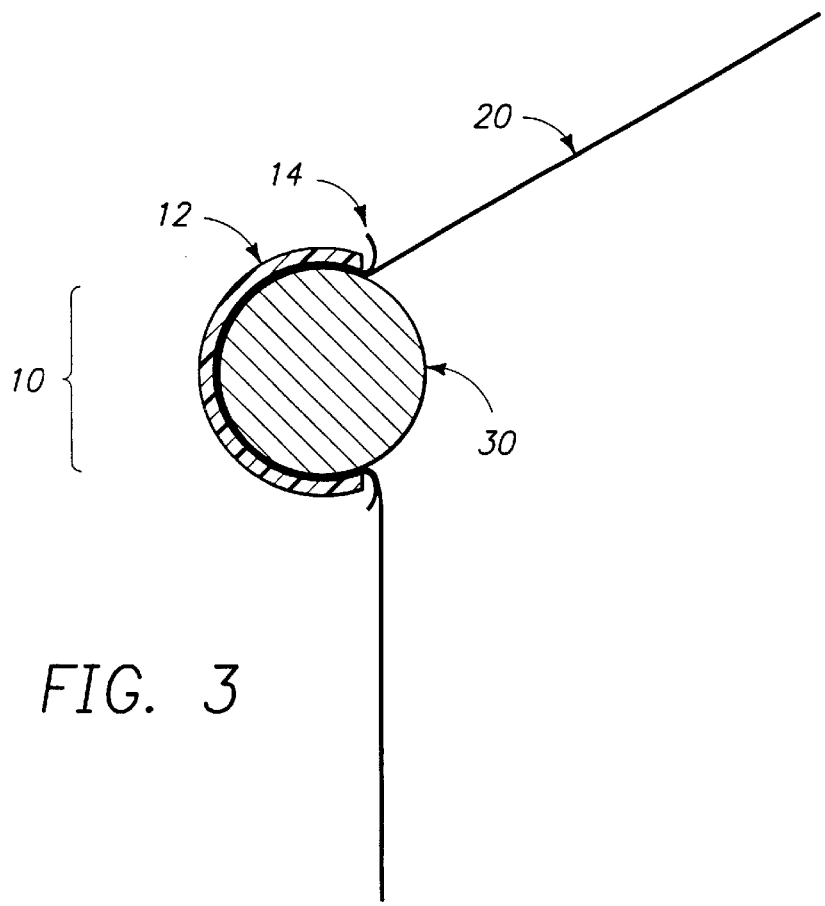
FIG. 3

PIPE CLIP TYPE FLEXIBLE-SHEET FASTENING DEVICE

This application claims benefit to provisional application 60/100,106 filed Sep. 14, 1998.

BACKGROUND OF THE INVENTION

1. Field of the Invention

The disclosed invention relates generally to a means of fastening or securing flexible-sheet goods to tubular components of structures (to create such composite products as awnings, tents and tent canopies, greenhouses, temporary carports, and the like) and more specifically it relates to an easily-reversible, non-damaging means of firmly securing the flexible-sheet elements to the tubular elements. Also, of course, any other structure or object to which tubular elements may be secured in any way, may become part of the composite structure, or at least may thereby be attached to the composite structure.

2. Description of Related Art

Several means are available in common use for the purpose of securing plastic, tarpaulins, fabric, or other flexible-sheet goods to tubular frameworks. Many applications employ rope tie-downs or elastic ("Bungee") cords, which often attach the flexible-sheet goods rather insecurely, which deteriorate over time, and which require a hole or holes in the sheet goods (often needing reinforcement with a grommet(s) to prevent tearing damage to the sheet goods). Some applications utilize lightweight, sometimes spring-loaded clips of various design which either suffer from a limitation on the strength of the connection, which may damage the sheet elements, or which may be expensive. Velcro fastening devices could also conceivably be utilized in place of rope or elastic ties, or could be affixed directly to the sheet goods via an elastic backing or by stitching; but would suffer from both the potential deterioration and the damage to the sheet goods mentioned above. While all such fastening devices may be suitable for some purposes, the disclosed invention improves upon them by conveniently and inexpensively allowing a firmer connection, without the necessity of making holes in, or attachments to, the sheet goods, in a manner, however, that is still easily removable. There are a number of prior art patents which attempt to address the application of sheet goods to a framework, generally by employing a device or devices, a part of which is secured to the framework, that grip(s) the sheet element continuously along its margins, or continuously along the framework that supports the sheet element. These can range from a fairly simple channel member, designed to be affixed to the framework, that allows the sheet goods to be secured into the channel with a flexible or semi-flexible insert, such as developed by Yang, et. al. (U.S. Pat. No. 4,638,532, Jan. 27, 1987) or Bloomfield (U.S. Pat. No. 4,267,876, May 19, 1981), to devices of varying complexity that in invert the above concept by employing an affixable channel of a contour such that a suitably matching member can be clipped over it, pinning the sheet goods in between, in the manner of Derrick, et. al. (U.S. Pat. No. 4,231,141, Nov. 4, 1980), which is currently on the market. This concept has been multiplied by the stacking two or more such devices on top of each other so that multiple layers of sheet goods may be anchored, as developed by Hogshead and Van Duyne (U.S. Pat. No. 4,682,642, Jul. 28, 1987). An affixable double-channel with a spring-steel insert along the line of that developed by Yoshinari (U.S. Pat. No. 4,144,622, May 20, 1979) has also been observed on the market. These devices suffer from overcomplication, difficulty of installation, deterioration over time of the semi-flexible insert (which allows the sheet goods to go slack or completely escape the device), a high initial expense to purchase, and furthermore make remodeling the framework to accommodate changes in dimension or addition of more framework very difficult. In addition, they would be quite difficult to secure to a rod or tubing type of framework.

SUMMARY OF THE INVENTION

A major aspect of the disclosed invention is that it provides a fastening device, or "pipe clip" fastener, for the purpose of fastening plastics, tarpaulins, fabrics, or other sheet elements to tubular structures, that substantially improves upon the prior art.

This fastening device will provide a firm connection of the sheet elements to the tubular framework(s) that will permit the sheet elements to be stretched, within reasonable limits, as tightly as desired.

This fastening device may be attached without making (or requiring pre-made) holes in the said sheet elements.

This fastening device is removable without damage to the said sheet elements, allowing easy restructuring of the framework if desired; or allowing the easy replacement of the sheet goods.

This fastening device is designed to be installed periodically along the framework, rather than continuously; and therefore can be adjusted in number to accommodate the actual gripping power required for the job, instead of wastefully over-securing the sheet goods in areas where this is not required.

This fastening device is simple, easily-utilized and inexpensively manufactured.

Further attributes of the invention are elucidated within the description below.

The foregoing aspects, attributes and objects, and further, related aspects, attributes and objects, of this disclosed invention are illustrated in one preferred embodiment diagrammed in the accompanying drawings. These drawings are for purposes of illustration, and it is cautioned that departures from these drawings in materials, design, and specific construction may occur without departure from the concept of the present invention. The invention may be manufactured or produced in a variety of sizes, shapes, lengths, gauges, colors, designs, and the like, without departing from the spirit of the disclosed invention.

BRIEF DESCRIPTION OF THE DRAWINGS

FIG. 1 is an end view of one embodiment of the disclosed invention, designed for tubular elements of circular cross-section.

FIG. 2 is a side view of this embodiment of the disclosed invention.

FIG. 3 is a sectional representation of the application of the disclosed invention as applied to a rod of circular cross-section.

DETAILED DESCRIPTION OF THE PREFERRED EMBODIMENT

Figure 4:
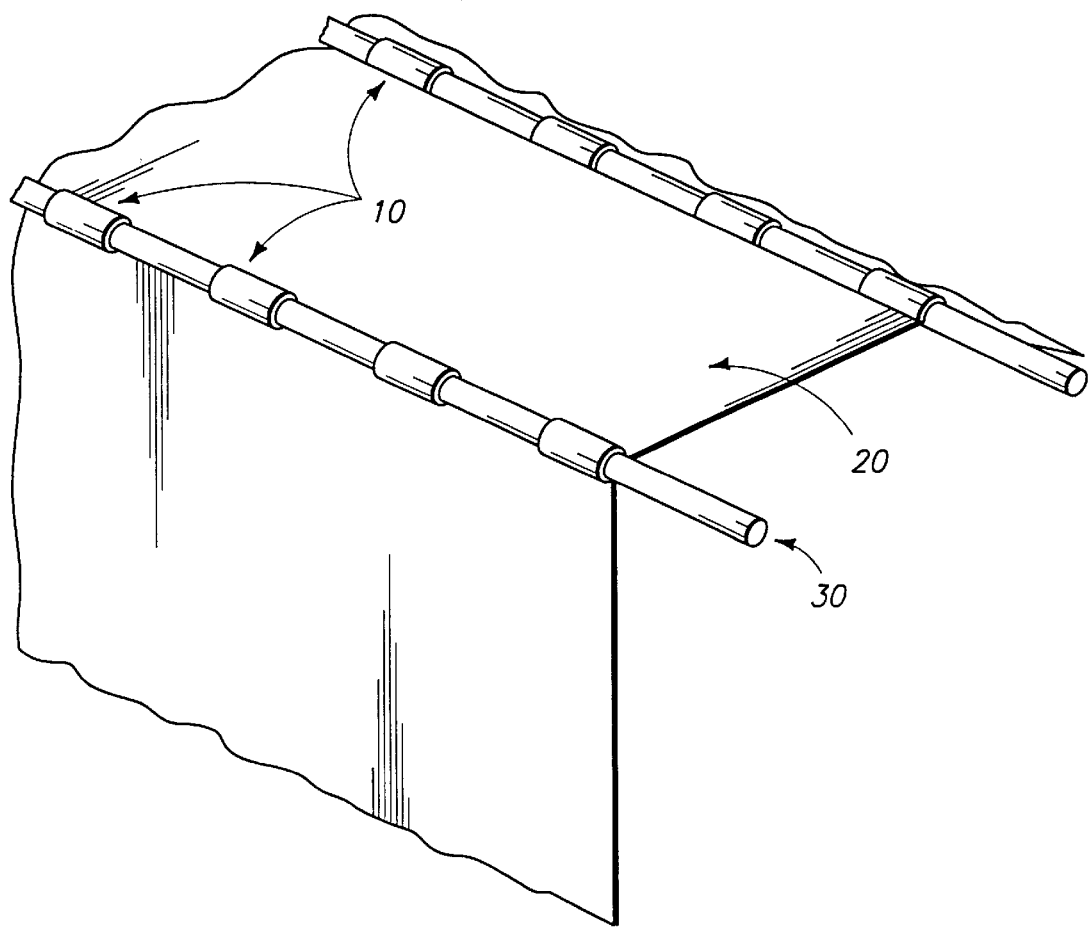
FIG. 4 is a representation of eight units of the disclosed invention as applied to a portion of a structure of common intended usage, such as a tent or greenhouse.

The Figures illustrate a fastening device 10, in which the structural element 12 is made of an appropriate material (commonly a segment of plastic pipe originally of circular cross-section in this embodiment; but with a section removed from one side of the tubular segment, creating a gap in the tubular segment, therefore forming a "C" in end view) with sufficient flexibility so that it may be conveniently slipped over any portion of a rod or tube of circular cross-section and of slightly smaller diameter. The structural element 12 has a curved exterior surface, a curved interior surface, two C-shaped edge portions (16, 16'), and two longitudinal edge portions (18, 18') between the two C-shaped edge portions (16, 16'), wherein the curved exterior surface, the curved interior surface, the C-shape edge portions (16, 16'), and the longitudinal edge portions (18, 18') collectively form a C-shaped cross-section of the structural element as shown in FIG. 1. On the inside surface of the device is a buffer material 14 of appropriate composition and quality such that it may protect any appropriate adjacent material, usually sheet goods of some kind, over which it is applied, from significant damage or deformation. This buffer 14 is shown as a sheet of material glued or otherwise fastened to the inside of the tubular portion 12, but any other properly effective buffer material that could be sprayed on, painted on, or otherwise applied to or incorporated into the interior surface of the tubular portion 12 would also suffice for purposes of this invention.

When a user of this invention wishes to affix a sheet of plastic, a tarpaulin, an awning fabric, or other sheet goods 20 to any desired structure that incorporates (in this described embodiment) a rod, pipe, or tubular pipe-like framing 30 upon which to support the sheet goods 20, the user employs a multiplicity of this invention 10 (i.e., a suitable number of clips 10) to affix the sheet goods 20 to the framing 30. The user stretches the sheet goods 20 tightly over the tubular framing elements 30, and applies the clip 10 by forcing the clip's open edges over the framing 30, keeping the buffer material 14 between the sheet goods 20 and the body of the clip 12 at all times.

LIST OF REFERENCE NUMBERS

10—pipe clip
12—body of clip
14—buffer material
20—sheet goods
30—tubular framing

What is claimed is:

1. A fastening clip device for securing flexible sheet elements to framework made of tubular elements, the fastening device comprising:

a structural element of flexible material, the structural element having a curved exterior surface, a curved interior surface, two C-shaped edge portions, and two longitudinal edge portions between the two C-shaped edge portions;

the curved exterior surface, the curved interior surface, the C-shape edge portions, and the longitudinal edge portions collectively forming a C-shaped cross-section of the structural element; and a sheet of buffer material provided onto the curved interior surface of the structural element and protruding beyond the two longitudinal edge portions, wherein the buffer material is for preventing contact of the flexible sheet elements with the two longitudinal edge portions and the curved interior surface of the structural element when the fastening clip device is securing the flexible sheet elements to the framework.

2. The fastening clip device of claim 1, wherein a multiplicity of the clip device are for securing the flexible sheet elements to the framework.

3. The fastening clip device of claim 1, wherein the buffer material is glued onto the curved interior surface of the structural element.

4. The fastening clip device of claim 1, wherein the buffer material is sprayed onto the curved interior surface of the structural element.

5. The fastening clip device of claim 1, wherein the buffer material is painted onto the curved interior surface of the structural element.

* * * * *